US005681783A

United States Patent [19]

Nilsson et al.

[11] Patent Number: 5,681,783
[45] Date of Patent: Oct. 28, 1997

[54] SINTERED WC-CONTAINING MATERIALS

[75] Inventors: Robert T. Nilsson, Coleman; Richard T. Fox; Stephen D. Dunmead, both of Midland, all of Mich.

[73] Assignee: The Dow Chemical Company, Midland, Mich.

[21] Appl. No.: 761,518

[22] Filed: Dec. 9, 1996

Related U.S. Application Data

[60] Division of Ser. No. 555,944, Nov. 13, 1995, Pat. No. 5,612,264, which is a continuation-in-part of Ser. No. 56,142, Apr. 30, 1993, abandoned.

[51] Int. Cl.$^6$ .................................................. C04B 35/56
[52] U.S. Cl. .......................................................... 501/87
[58] Field of Search ................................................ 501/87

[56] References Cited

U.S. PATENT DOCUMENTS

| | | | |
|---|---|---|---|
| 4,744,943 | 5/1988 | Timm | 419/10 |
| 4,753,678 | 6/1988 | Maruyama et al. | 75/238 |
| 4,828,584 | 5/1989 | Cutler | 51/307 |
| 4,923,512 | 5/1990 | Timm et al. | 75/239 |
| 4,945,073 | 7/1990 | Dubensky et al. | 501/93 |
| 5,089,447 | 2/1992 | Timm et al. | 501/87 |
| 5,215,945 | 6/1993 | Dubensky et al. | 501/94 |
| 5,256,608 | 10/1993 | Dubensky et al. | 501/94 |
| 5,334,561 | 8/1994 | Matsui et al. | 501/87 |

FOREIGN PATENT DOCUMENTS

| | | |
|---|---|---|
| 0360567 | 3/1990 | European Pat. Off. . |
| 0559901 | 9/1993 | European Pat. Off. . |
| 3115541 | 5/1991 | Japan . |
| 533098 | 2/1993 | Japan . |

OTHER PUBLICATIONS

A.G. Evans, "Impact Damage Mechnics: Solid Projectiles," *Treatise on Materials Science and Technology*, vol. 16, pp. 63–65 (1979).

J.K. Lancaster, "Absrasive Wear," *Tribology in Particulate Technology*, pp. 329 (1987).

E.A. Almond et al., "Some Characteristics of Very-–Fine–Grained Hardmetals," Metal Powder Report, Jul./Aug. 1987, vol. 42, No. 7/8.

*Primary Examiner*—Karl Group

[57] ABSTRACT

A tungsten carbide-containing material in which the tungsten carbide has the general formula, $W_xC$, wherein x is greater than one and less than two and the material has less than 0.20 weight percent cobalt, a density of at least about 97% of its theoretical density, and a Vickers hardness of at least about 2400 kg/mm$^2$.

7 Claims, 2 Drawing Sheets

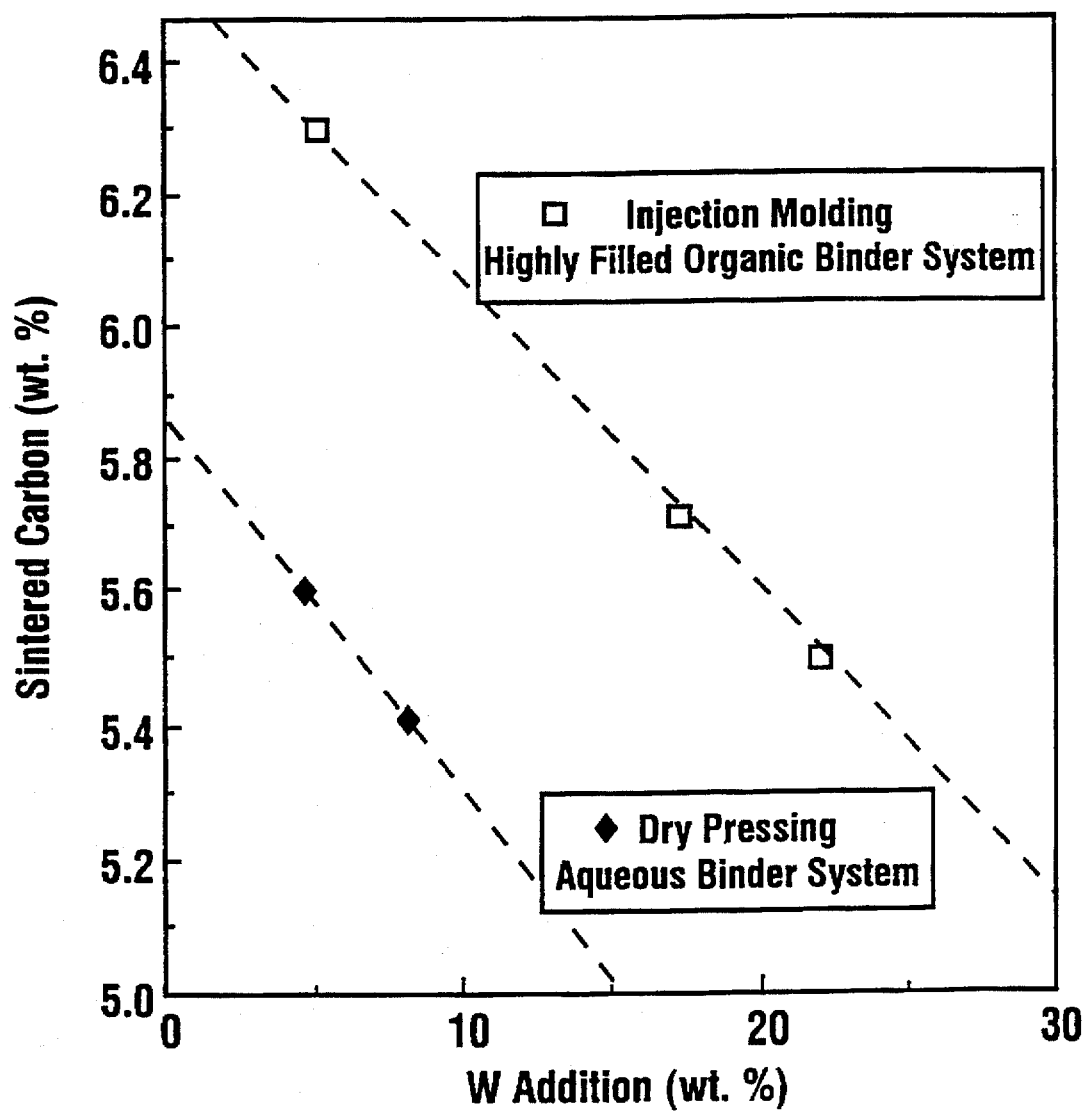

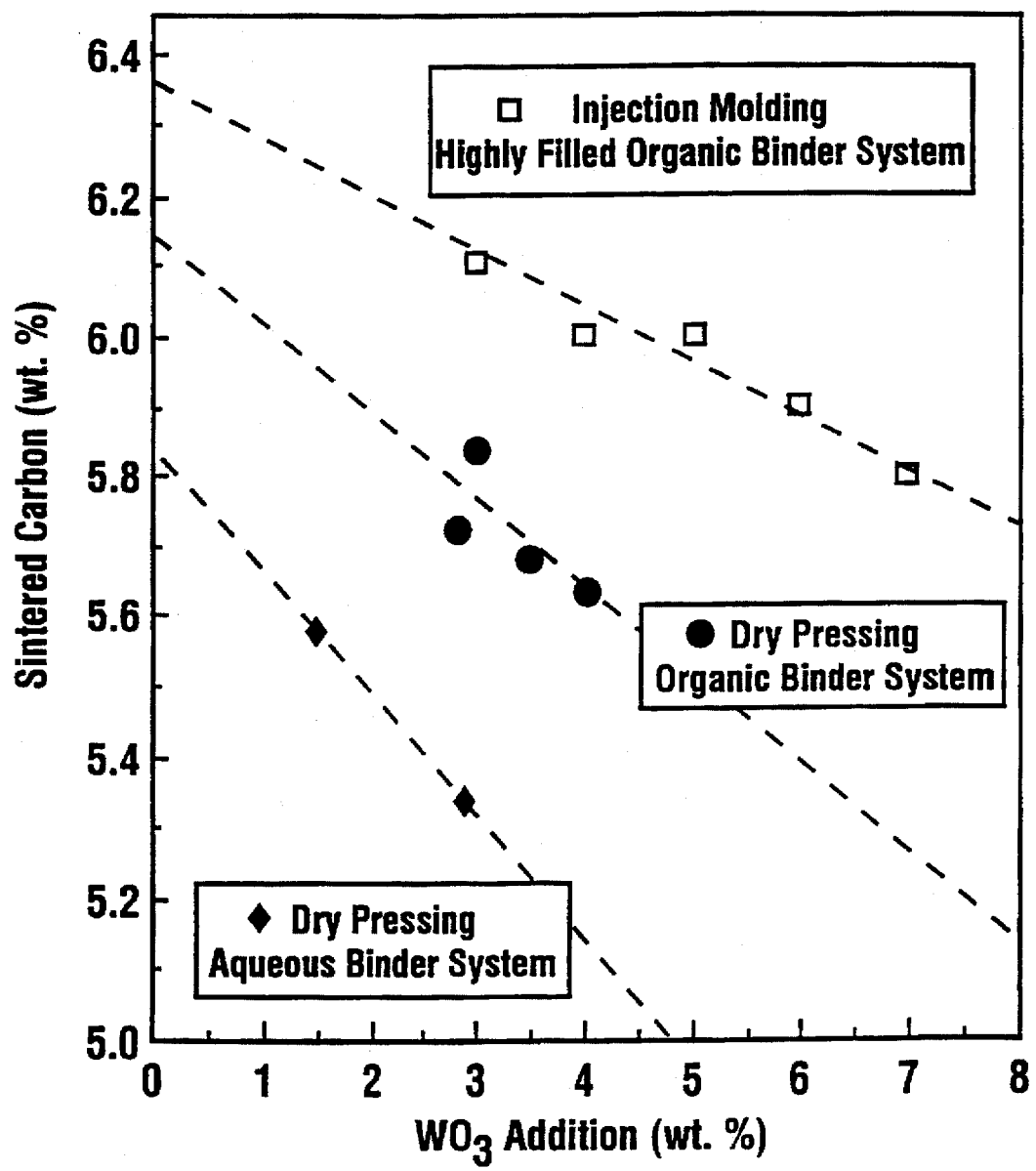

SINTERED WC-CONTAINING MATERIALS

CROSS-REFERENCE TO RELATED APPLICATION

This is a divisional of application Ser. No., 08/555,944 filed Nov. 13, 1995 now U.S. Pat. No. 5,612,264; which is a continuation-in-part of U.S. designated application WO 94/25412, filed Apr.26, 1994; which application is incorporated by reference and which is a continuation-in-part of application Ser. No. 08/056,142, filed Apr. 30, 1993, now abandoned.

BACKGROUND OF THE INVENTION

1. Field of the Invention

The present invention relates generally to sintered tungsten carbide-containing materials and methods for making same and, more particularly, to sintered tungsten carbide-containing materials containing substoichiometric levels of carbon and methods for making same.

2. Description of the Related Art

Sintered tungsten carbide-containing materials are popular in applications requiring high wear resistance and/or cutting performance. To achieve the desired levels of strength or toughness and enhance the sinterability of the tungsten carbide-containing materials, metal binders are often added to the starting materials prior to sintering. The resulting sintered tungsten carbide-metal materials are referred to as tungsten carbide cermets or hard metals. Cobalt is known to be the best binder for tungsten carbide, however, careful control of the level of carbon in the tungsten carbide-containing material before sintering must be exercised or inferior material properties result.

If the carbon in the pre-sintered material is substoichiometric relative to the level of tungsten, an undesirable brittle complex intermetallic carbide, specifically, eta-phase $Co_3W_3C$, is easily formed and remains in the sintered product. If the carbon in the pre-sintered material is hyperstoichiometric relative to the level of tungsten, undesirable graphite or amorphous carbon precipitates and remains in the sintered product. Total carbon is, therefore, typically controlled in tungsten carbide/cobalt cermets to a difference from stoichiometric of within 0.1% (i.e., +/−0.05%) to produce acceptable material.

While tungsten carbide-cobalt cermets find tremendous utility, there are situations that demand higher hardnesses and better wear resistances than that which is achieved with the traditional tungsten carbide-cobalt cermets. Higher hardnesses and improved wear resistances can be achieved by substantially reducing or eliminating the metallic binder. However, the sinterability of these "binderless" materials is greatly hindered.

To produce an object formed of sintered tungsten carbide-containing material, a preform containing tungsten carbide powder is formed, which is usually subjected to an organic binder burn-out process, and then sintered. Unfortunately, the organic binder provides excess carbon which is often introduced into the pre-sintered tungsten carbide-containing material through the use and subsequent pyrolysis of organic binders, such as thermoplastic binder systems. Many attempts have been made to minimize or remove the excess carbon introduced by the organic binders.

Previously, an attempt to minimize the level of carbon introduced by organic binders in sintered tungsten carbide-containing materials was through the use of soluble binders which had to be removed using chemical extraction, prior to sintering. However, such chemical extraction required additional handling of the object, the use of hazardous solvents, and controlled drying conditions to maintain integrity of the object.

Another prior art attempt to minimize the level of carbon introduced by organic binders in sintered tungsten carbide-containing materials was by reacting the carbon with hydrogen gas during burn-out and/or sintering. However, the flammability of hydrogen gas presented additional safety concerns.

Yet another prior art attempt at minimizing the level of carbon introduced into sintered tungsten carbide-containing materials was through the use of alternative binder systems which left little or no residual carbon in the pre-sintered material after pyrolysis. However, the ceramics industry is familiar with traditional thermoplastic binder systems and their processing techniques, so that the development and utilization of alternative binder systems was seen as undesirable.

The sintering of a tungsten carbide-containing preform may be accomplished by pressure-assisted or pressureless processes. Pressure-assisted sintering processing is especially suitable for forming the most dense, hard tungsten carbide-containing materials. However, one of ordinary skill in the art knows that pressure-assisted sintering processes are expensive and difficult to use when forming objects of complex shapes or objects having small openings. Pressureless sintering, on the other hand, has been found extremely suitable for forming complex-shaped objects and objects with small openings.

It is, therefore, desirable to have an improved tungsten carbide (WC) based material with improved control of the total carbon therein as it results in a sintered tungsten carbide-containing material which has improved hardness, increased density, and may be prepared by simple methods which do not rely on using soluble binders and removing them thereafter, or on reacting with flammable hydrogen gas. It is also desirable to have available a method which is simple and capable of forming complex sintered objects that may have small openings.

SUMMARY OF THE INVENTION

To achieve the foregoing objects of making an improved sintered tungsten carbide-containing material with improved control of total carbon to achieve increased hardness and density, a first embodiment in accordance with the present invention is such a material made by adding certain carbon-lowering additives, or by treating the tungsten carbide preform precursor materials, or the actual preforms themselves, to form a high-density tungsten carbide-containing material. This lowered carbon content makes possible the pressureless sintering of a preform of tungsten carbide including these additives at an elevated temperature which produces a desirable densified part.

The preform contains tungsten carbide powder and has a composition such that the resulting sintered tungsten carbide-containing material has at most 6.05 weight percent tungsten-bound carbon, preferably at most about 6.0 weight percent tungsten-bound carbon, based on the total weight of tungsten and tungsten-bound carbon in the sintered tungsten carbide-containing material. Preferably, the tungsten-bound carbon is present in an amount of at least about 5.0 weight percent based on the total weight of tungsten and tungsten-bound carbon in the sintered material.

One way of achieving the desired low level of tungsten-bound carbon in the sintered tungsten carbide-containing material is by, prior to the sintering step, introducing oxygen to the tungsten carbide powder, in an amount to sufficiently lower the carbon content to achieve the desired substoichiometric carbon level. Tungsten trioxide has been found to especially enhance carbon removal. We hypothesize that oxidation of the WC allows evolution of CO during sintering, resulting in lower overall carbon content in the composition.

Another way of achieving the desired level low of tungsten-bound carbon in the sintered tungsten carbide-containing material is by adding a carbon-lowering material selected from the group consisting of tungsten, ditungsten carbide, tungsten oxide, carbon-getter metals, oxides of carbon-getter metals, nitrides of carbon-getter metals, and combinations thereof. The carbon-getter metals are those metals of which the carbides thereof are more thermodynamically stable than monotungsten carbide. These additives allow reaction with carbon that is already present.

As described more fully hereinbelow, the WC material can also be sintered within an oven that is equipped with tungsten metal heating elements, as opposed to graphite, in order to influence the carbon level of the WC material being sintered.

Another embodiment of the present invention is made by forming a high-density tungsten carbide-containing material which includes sintering a preform at an elevated temperature using a pressure-assisted sintering process. The preform contains tungsten carbide powder and has a composition such that the resulting sintered tungsten carbide material has at most 6.05 weight percent tungsten-bound carbon, preferably at most about 6.0 weight percent tungsten-bound carbon, based on the total weight of tungsten and tungsten-bound carbon in the sintered tungsten carbide-containing material. The level of tungsten-bound carbon in this embodiment is controlled by a technique selected from the group consisting of (a) oxidizing the precursor tungsten carbide powder, (b) adding a carbon-lowering material to the tungsten carbide powder, or (c) a combination thereof. Oxidation may be accomplished by milling the WC powder in water. The carbon-lowering material in this embodiment is selected from the group consisting of tungsten oxide, ditungsten carbide, carbon-getter metals, oxides of carbon-getter metals, nitrides of carbon-getter metals, and combinations thereof. If the oxidizing technique is selected, the technique is performed by oxidizing the tungsten carbide powder, prior to the sintering step, sufficiently to achieve the desired substoichiometric carbon level.

Yet another embodiment of the present invention is a tungsten carbide-containing material in which the tungsten carbide has the general formula, $W_xC$, wherein x is greater than one and less than two and the material has less than 0.20 weight percent cobalt. The tungsten carbide-containing material has a density of at least about 97% of its theoretical density and a Vickers hardness of at least about 2400 kg/mm$^2$.

Preferably, in the tungsten carbide-containing material, x is from about 1.01 to about 1.13 and the cobalt is present in an amount of less than about 0.15 weight percent, and the material has a density of at least about 98% of its theoretical density, and a Vickers hardness of at least about 2500 kg/mm$^2$.

Although it is hoped that a sufficiently densified part is achievable by pressureless sintering of a WC preform with our lowered carbon content, it is further possible to combine both features of a small amount of cobalt from nearly zero weight percent to about one weight percent in combination with substoichiometric levels of carbon in order to achieve a WC-based material having higher hardnesses and better wear resistances than conventional cobalt-containing WC cermets, while still being able to use the less expensive pressureless sintering techniques. This enables one to achieve the benefits of both improved physical properties and economics.

Other objects, features, and advantages of the present invention will be readily appreciated as the same becomes better understood after reading the subsequent description taken in conjunction with the appendant drawings.

BRIEF DESCRIPTION OF THE DRAWINGS

FIG. 1 is a graph showing the effect of tungsten addition to preforms of tungsten carbide powder on the carbon levels of the resulting sintered tungsten carbide materials.

FIG. 2 is a graph showing the effect of tungsten trioxide addition to preforms of tungsten carbide powder on the carbon levels of the resulting sintered tungsten carbide materials.

DESCRIPTION OF THE PREFERRED EMBODIMENT(S)

Method Embodiments

One embodiment of the present invention is a method of forming a carbon-substoichiometric high-density tungsten carbide-containing material which includes sintering a WC having a low level of carbon preform at an elevated temperature. The preform contains tungsten carbide powder and has a composition such that the resulting sintered tungsten carbide-containing material has at most 6.05 weight percent tungsten-bound carbon, preferably, at most about 6.0 weight percent tungsten-bound carbon, and, more preferably, at most about 5.95 weight percent tungsten-bound carbon, based on the total weight of tungsten and tungsten-bound carbon in the sintered tungsten carbide-containing material. Preferably, the resulting sintered tungsten carbide-containing material has at least about 5.0 weight percent tungsten-bound carbon, more preferably, at least about 5.5 weight percent tungsten-bound carbon, and, most preferably, at least about 5.7 weight percent tungsten-bound carbon, based on the total weight of tungsten and tungsten-bound carbon in the sintered material.

In an effort to lower total carbon levels in the matrix, one way of achieving the desired level of tungsten-bound carbon in the sintered tungsten carbide-containing material is by, prior to the sintering step, oxidizing the tungsten carbide powder sufficiently to achieve the desired substoichiometric carbon level.

Another way of achieving the desired level of tungsten-bound carbon in the sintered tungsten carbide-containing material is by adding a carbon-lowering material to the tungsten carbide powder. Examples of carbon-lowering materials include tungsten, ditungsten carbide, tungsten oxide, carbon-getter metals, oxides of carbon-getter metals, nitrides of carbon-getter metals, and combinations thereof. The carbon-getter metals are those metals of which the carbides thereof are more thermodynamically stable than monotungsten carbide.

The details of the various ways in which the desired carbon level may be achieved will be discussed hereinbelow.

Typical prior art densification processes in the ceramics industry have included preparing a ceramic powder blend with organic binders as processing aids, forming a preform from the ceramic powder blend, burning out organic binder materials from the preform, sintering the preform after binder burn-out, and, finally, cooling the sintered product.

Generally, in the preparation of a densified tungsten carbide-containing material, a ceramic powder blend which contains monotungsten carbide powder is first prepared. Desirable starting powder sizes fall within a range of from greater than 0.0 micrometer up to 1.1 micrometer. The range is preferably from 0.1 to 0.6 micrometer and, more preferably, from 0.1 to 0.4 micrometer. Such powders may, however, be more difficult to process than powders within the broader range of 0.1 to 1.1 micrometer. In some applications, the resultant properties may be sufficiently desirable to outweigh any such processing difficulties.

Tungsten carbide powders having an average particle size of less than or equal to 1.1 micrometer are commercially available. One such powder, "SYL-CARB" Type SC104, available from Osram/Sylvania, Towanda, Pa., has a nominal average particle size of 0.6 micrometer and includes a small amount of vanadium carbide as a grain growth inhibitor. Another common grain growth inhibitor used in the industry is chromium carbide. Typically, such grain growth inhibitors are employed in amounts of from about 0.2 to about 2 weight percent based on the weight of the total powder in the ceramic powder blend.

Attriting such a powder, whether it be by wet attrition or dry attrition methods, reduces the average particle size, shifts the grain size distribution, and more uniformly disperses the grain growth inhibitor, if present. Even in the absence of a grain growth inhibitor, attrition provides the benefits of smaller average particle size and, therefore, higher final densities and improved mechanical properties. As a further alternative, powders with even larger average particle size may be used provided they are milled or attrited under conditions sufficient to reduce the average particle size to less than or equal to 1.1 micrometer.

The tungsten carbide powders need not be 100% pure. In other words, they may contain very small amounts, normally less than 1 weight percent based on the total powder weight, of other materials so long as the other materials do not adversely effect the densification of the powder or the physical properties of the resultant densified parts. The other materials may, for example, be present as a result of powder synthesis procedures or as residue from milling operations, such as cobalt.

Cobalt may also be added to the ceramic powder blend intentionally to enhance sinterability. The presence of cobalt improves the properties of the resultant sintered tungsten carbide-containing material. However, cobalt is not necessary if the carbon content in the sintered material is controlled according to the present invention. It has been found that sintered material with superior hardness may be formed when employing from 0 to less than 0.20 weight percent cobalt, even from 0 to about 0.15 weight percent cobalt, based on the total weight of the ceramic powder blend.

Carbides other than tungsten carbide may also be a part of the ceramic powder blend. Such carbides include refractory metal carbide powders and solid solution (mixed metal) carbides. The metal portion of the refractory metal carbide and solid solution carbide powders is selected from Groups IVB, VB, and VIB of The Periodic Table of the Elements (Chemical Abstracts Service (CAS) version). The metals are titanium, zirconium, and hafnium for Group IVB, vanadium, niobium, and tantalum for Group VB, and chromium, molybdenum, and tungsten for Group VIB. Illustrative solid solution carbides include tungsten-titanium carbide, tungsten-molybdenum carbide, tungsten-vanadium carbide, tungsten-tantalum carbide, molybdenum-tantalum carbide, titanium-tantalum carbide, tungsten-titanium-tantalum carbide, hafnium-tantalum carbide, titanium-hafnium carbide, tungsten-chromium carbide, tungsten-titanium-chromium carbide, tungsten-tantalum-chromium carbide, and titanium-tantalum-hafnium carbide.

Solid solution carbides and refractory metal carbides including WC may be synthesized using the apparatus described in U.S. Pat. No. 5,110,565, which patent is incorporated herein by reference. The apparatus is described in general terms in the patent at column 6, lines 52–56, and in greater detail at column 7, line 5, through column 8, line 61.

In general, a reactive particulate mixture of at least one metallic oxide selected from the oxides of the Group IVB, Group VB, and Group VIB metals and a carbon source is heated to an elevated temperature at a rate of between 100K/second and 100,000,000K/second to effect rapid carbothermal reduction of the mixture. The temperature is maintained for a period of time sufficient to convert the mixture into a product selected from a metallic carbide, a metallic carbide precursor, a solid solution carbide, a solid solution carbide precursor, or a mixture thereof.

Metallic carbides such as WC can be prepared by an alternate procedure wherein a non-static solid reactant mixture of a metal oxide and a source of carbon is heated to a first elevated temperature in a non-reducing atmosphere (e.g., nitrogen or argon) to partially carburize the mixture. The partially carburized mixture is then cooled, mixed with an additional amount of carbon sufficient to form an adjusted mixture having a total carbon content equal to a stoichiometric amount needed to make the metallic carbide. The adjusted mixture is carburized in a hydrogen-containing atmosphere at a second elevated temperature that is sufficient to yield a metallic carbide having a particle size of less than 0.2 micrometer.

A preform of the ceramic powder blend is then formed by any technique, such as slip casting, extrusion, injection molding, and dry pressing. A binder, such as paraffin or polyethylene, is commonly admixed with the ceramic powder blend, usually by wet mixing, to facilitate the forming technique. Other materials, such as lubricants, dispersants, flocculants, etc., may also be added to the ceramic powder blend. As mentioned above, the densification process continues with, typically, a preheating step for binder removal and sintering the debindered preform. Details of the binder burn-out and sintering steps are provided herein below.

According to the invention, the composition of the preform must be such that the sintered tungsten carbide-containing material contains at most 6.05 weight percent tungsten-bound carbon, preferably at most about 6.0 weight percent tungsten-bound carbon, preferably, at least about 5.0 weight percent tungsten-bound carbon, and, more preferably, at least about 5.5 weight percent tungsten-bound carbon, based on the total weight of tungsten and tungsten-bound carbon. When carbon is bound in a solid solution carbide which contains tungsten, that carbon is also considered to be a tungsten-bound carbon.

To achieve the desired level of tungsten-bound carbon in the sintered body, the composition of the preform is controlled and, thus, the composition of the ceramic powder blend is controlled.

In pure monotungsten carbide, carbon is present at a level of 6.13 weight percent based on the weight of the monotungsten carbide. In a theoretical system, the carbon level of monotungsten carbide would remain at 6.13 weight percent, even after sintering. Therefore, to practice the invention, the carbon level must be lowered below 6.13 weight percent, that is, to at most 6.05 weight percent, preferably at most about 6.0 weight percent. Toward this end, it must also be considered that often there is free carbon remaining in the preform from the binder even after debindering operations.

Various methods may be used to achieve a tungsten-bound carbon content in the sintered body of at most 6.05 weight percent. These methods include the addition of carbon-lowering materials to the ceramic powder blend. Carbon-lowering materials include tungsten, ditungsten carbide, tungsten oxide, carbon-getter metals, oxides of carbon-getter metals, nitrides of carbon-getter metals, and combinations thereof. Another method of controlling the carbon content in the sintered body is by oxidizing the tungsten carbide powder, possibly by milling the WC powder in water. Each of these methods will be addressed in detail herein below.

One method of achieving a tungsten-bound carbon content in the sintered body of at most 6.05 weight percent is by the addition of elemental tungsten to the ceramic powder blend. If free carbon and elemental tungsten are present in a preform containing monotungsten carbide during the burn-out step or during sintering, the elevated temperatures of the two processes will cause the following chemical reaction to occur:

$$W+C \Longrightarrow WC$$

An equation which represents the ideal chemical effect of the addition of tungsten to a preform of monotungsten carbide powder when free carbon is present is as follows:

$$\{C\}=-0.064\{W\}+\{C\}_o$$

wherein $\{C\}$ represents the weight percent of tungsten-bound carbon plus free carbon after sintering based on the total weight of tungsten plus tungsten-bound carbon; $\{W\}$ represents the weight percent of tungsten added based on the weight of the monotungsten carbide powder; and $\{C\}_o$ represents the weight percent of tungsten-bound carbon plus free carbon in the ceramic powder blend based on the total weight of tungsten plus tungsten-bound carbon before adding the elemental tungsten. With this equation, one can calculate how much tungsten to add to a ceramic powder blend to achieve the desired level of tungsten-bound carbon by knowing the starting level of carbon. The above-described equation will only give approximate values to what will occur, because, e.g., the preforms will have a varying level of oxygen which will affect the sintered carbon content.

If free carbon is not present in the preform, but elemental tungsten is present, during the burn-out step or during sintering, the following chemical reaction will occur:

$$W+WC \Longrightarrow W_2C$$

An equation which represents the ideal effect of the addition of tungsten to a preform of monotungsten carbide powder when no free carbon is present is as follows:

$$\{C\}=\{C\}_o/(1+\{W\})$$

wherein $\{C\}$ represents the weight percent of tungsten-bound carbon after sintering based on the total weight of tungsten plus tungsten-bound carbon; $\{W\}$ represents the weight percent of tungsten added based on the weight of the monotungsten carbide powder; and $\{C\}_o$ represents the weight percent of tungsten-bound carbon in the ceramic powder blend based on the total weight of tungsten plus tungsten-bound carbon before adding the elemental tungsten. With this equation, one can calculate how much tungsten to add to a ceramic powder blend to achieve the desired level of tungsten-bound carbon, by knowing the starting level of carbon. The above-described equation will only give approximate values to what will occur, because, e.g., the preforms will have a varying level of oxygen which will effect the sintered carbon content. The preferred level of tungsten metal added to a preform depends on the estimated carbon content of the preform after binder burn-out, the oxidation of the ceramic powder blend, and the particular binder system employed. When tungsten is the only additive employed for reducing the carbon level and injection molding processes are employed in which the greenware preform contains about 50 volume percent organic binder, typical levels of tungsten addition to monotungsten carbide powder range from about 10 to about 30 weight percent tungsten, and, more typically, from about 15 to about 22 weight percent tungsten, based on the weight of the monotungsten carbide powder. Typical levels for dry pressing processing would most likely be lower.

A second method of achieving a tungsten-bound carbon content of at most 6.05 weight percent in a tungsten carbide-containing sintered body is by the addition of tungsten trioxide to the ceramic powder blend. If free carbon and tungsten trioxide are present in a preform containing monotungsten carbide during burnout or sintering, we hypothesize that the elevated temperatures of the two processes will cause the following chemical reaction to occur:

$$WO_3+4C \Longrightarrow WC+3CO(g)$$

along with the less prominent chemical reaction:

$$2WO^3+5C \Longrightarrow 2WC+3CO_2$$

An equation which represents the ideal effect of the addition of tungsten trioxide to a preform of monotungsten carbide powder when free carbon is present is as follows:

$$\{C\}=x\{WO_3\}+\{C\}_o,$$

wherein x is from −0.078 to −0.156, $\{C\}$ represents the weight percent of tungsten-bound carbon plus free carbon after sintering based on the total weight of tungsten plus tungsten-bound carbon; $\{WO_3\}$ represents the weight percent of tungsten trioxide added based on the weight of the monotungsten carbide powder; and $\{C\}_o$ represents the weight percent of tungsten-bound carbon plus free carbon in the ceramic powder blend based on the total weight of tungsten plus tungsten-bound carbon before adding the tungsten trioxide. In this equation, the value of x varies from −0.078 to −0.156 depending on the relative amounts of carbon monoxide and carbon dioxide produced. When carbon monoxide is produced and carbon dioxide is not produced, x is −0.156. When carbon dioxide is produced and carbon monoxide is not produced, x is 0.078. In most cases, it is suspected that both gases are produced; however, since carbon monoxide is most likely more prominent, x will typically be closer to 0.156 than to −0.078. With this equation, one can calculate how much tungsten trioxide to add to a ceramic powder blend to achieve the desired level of tungsten-bound carbon by knowing the starting level of carbon. The above-described equation will only give approximate values to what will occur, because, e.g., the preforms will have a varying level of oxygen which will affect the sintered carbon content.

If free carbon is not present in the preform, but tungsten trioxide is present, during the burn-out step or during sintering, the following chemical reaction will occur:

$$WO_3 + 7WC \Longrightarrow 4W_2C + 3CO(g)$$

along with the less prominent chemical reaction:

$$4WO_3 + 16WC \Longrightarrow 10W_2C + 6CO_2$$

An equation which represents the ideal effect of the addition of tungsten trioxide to a preform of monotungsten carbide powder when no free carbon is present is as follows:

$$\{C\} = x\{WO_3\} + \{C\}_o,$$

wherein x is from −0.078 to −0.156, $\{C\}$ represents the weight percent of tungsten-bound carbon after sintering based on the total weight of tungsten plus tungsten-bound carbon; $\{WO_3\}$ represents the weight percent of tungsten trioxide added based on the weight of the monotungsten carbide powder; and $\{C\}_o$ represents the weight percent of tungsten-bound carbon in the ceramic powder blend based on the total weight of tungsten plus tungsten-bound carbon before adding the tungsten trioxide. With this equation, one can calculate how much tungsten trioxide to add to a ceramic powder blend to achieve the desired level of tungsten-bound carbon by knowing the starting level of carbon. The above-described equation will only give approximate values to what will occur, because, e.g., the preforms will have a varying level of oxygen which will effect the sintered carbon content. When tungsten trioxide is the only additive employed for reducing the carbon level and injection molding processes are employed in which the greenware preform contains about 50 volume percent organic binder, typical levels of tungsten trioxide addition to monotungsten carbide powder range from about 3.5 to about 7 weight percent tungsten trioxide, and, more typically, from about 3.9 to about 5 weight percent tungsten trioxide, based on the weight of the monotungsten carbide powder. Typical levels for dry pressing processing would most likely be lower and would depend on the oxygen content of the powder.

The effects on the sintered product of the addition of tungsten and tungsten oxide to tungsten carbide powder are graphically illustrated in FIGS. 1 and 2. FIG. 1 shows the effect of tungsten addition on exemplary sintered tungsten carbide materials using two different binder systems. The square markings which determine the upper line represent materials made using 50 volume percent binder. Injection molding and extrusion processes are processes which may use 50 volume percent binder. The diamond markings determine the lower line and represent materials made by using the aqueous binder system "METHOCEL" binder. Aqueous binder systems oxidize the tungsten carbide powder during processing and, therefore, result in less carbon in the sintered material. As can be seen by the different y intercepts, the different binder combinations result in different sintered carbon levels when no tungsten is added.

FIG. 2 shows the effect of $WO_3$ addition on exemplary sintered tungsten carbide materials using three different binder systems. The square markings which determine the upper line represent materials made using 50 volume percent binder. Again, injection molding and extrusion processes are processes which may use 50 volume percent binder. The circular markings determine the middle line and represent materials made using about 15 to 25 volume percent bonder. Dry pressing processes typically use about 15 to 25 volume percent binder. The diamond markings determine the lower line and represent material made using the aqueous binder system "METHOCEL". As can be seen by the different y intercepts, the various binder systems result in different sintered carbon levels when no $WO_3$ is added. Note that the three lines have approximately the same slope which is predicted by the mathematical equations above for tungsten trioxide addition.

FIGS. 1 and 2 show that the sintered carbon level can be controlled with the addition of the carbon-lowering materials, tungsten and tungsten oxide. In comparing FIGS. 1 and 2, it can be seen that the addition of tungsten trioxide has a greater effect on the level of sintered carbon level than does tungsten metal.

A third method for achieving a tungsten-bound carbon content of at most 6.05 weight percent in a tungsten carbide-containing sintered body is by the addition of ditungsten carbide powder to monotungsten carbide powder. If free carbon and ditungsten carbide are present in a preform containing monotungsten carbide during burn-out or sintering, the elevated temperatures of the two processes will cause the following chemical reaction to occur:

$$W_2C + C \Longrightarrow 2WC$$

If ditungsten carbide powder is added to monotungsten carbide powder and no free carbon is present in the preform, the presence of the ditungsten carbide powder will automatically lower the level tungsten-bound carbon below 6.13 weight percent based on the total weight of tungsten-bound carbon and tungsten because for every mole of ditungsten carbide added, two moles of tungsten and only one mole of carbon are added.

Typical levels of ditungsten carbide powder may be determined from the typical levels discussed above for tungsten or tungsten trioxide. When determining the typical levels, the levels of the tungsten or tungsten trioxide should be converted to a molar basis and the number of moles of the ditungsten carbide needed for each mole of carbon relative to that needed by tungsten or tungsten trioxide must be considered.

Mathematical equations similar to those above for the addition of tungsten or tungsten trioxide to monotungsten carbide may also be determined for the addition of ditungsten carbide.

A fourth method of achieving a tungsten-bound carbon content of at most 6.05 weight percent in a tungsten carbide-containing sintered body is by the addition of carbon-getter materials, such as carbon-getter metals, oxides of carbon-getter metals, and/or nitrides of carbon-getter metals to monotungsten carbide powder. Carbon-getter metals are those metals of which the carbides thereof are more thermodynamically stable than monotungsten carbide. At elevated temperatures during burn-out or sintering, the carbon-getter metals (M) will react according to the following chemical equation:

$$M + 2WC \Longrightarrow MC + W_2C$$

The above equation is not necessarily chemically balanced depending on the specific carbon-getter metal, oxide, or nitride used. If a carbon-getter metal oxide is employed, the oxide has the added advantage of supplying oxygen which will react with any free carbon available and/or some of the carbon in the monotungsten carbide, forming carbon monoxide and/or carbon dioxide gas. As the carbon monoxide gas is formed and evolves from the preform, the level of tungsten-bound carbon in the sintered product is further reduced. Mathematical equations similar to those above for the addition of tungsten or tungsten trioxide may also be determined for the addition of carbon-getter metals, their oxides, and/or their nitrides to the ceramic powder blend.

Typical levels of carbon-getter metals, their oxides, and/or their nitrides may be determined from the typical levels discussed above for tungsten or tungsten trioxide. When determining the typical levels, the levels of the tungsten or tungsten trioxide should be converted to a molar basis and the number of moles of the carbon-getter material needed for each mole of carbon relative to that needed by tungsten or tungsten trioxide must be considered.

Examples of carbon-getter metals include titanium, tantalum, hafnium, zirconium, niobium, and molybdenum.

A fifth method of achieving a tungsten-bound carbon content of at most 6.05 weight percent in a tungsten carbide-containing sintered body is by oxidizing the monotungsten carbide, which may be accomplished by oxidizing pure monotungsten carbide powder, a ceramic powder blend containing monotungsten carbide powder, and/or a preform containing monotungsten carbide powder. Oxidizing the monotungsten carbide may be accomplished by exposing monotungsten carbide to water or to an oxygen-containing atmosphere, such as pure oxygen or air. One way of exposing monotungsen carbide to water is through the use of milling the powder in aqueous medium. For example, a ceramic powder blend containing monotungsten carbide powder may be combined and milled with "METHOCEL" organic binder which has been dissolved in water. Alternatively, another aqueous-based binder system may be used.

Oxidizing monotungsten carbide follows the following chemical reaction:

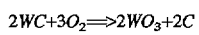

$$2WC + 3O_2 \Longrightarrow 2WO_3 + 2C$$

When the preform has free carbon therein, during burn-out or sintering, the following chemical reaction occurs:

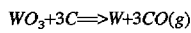

$$WO_3 + 3C \Longrightarrow W + 3CO(g)$$

as well as the less prominent reaction:

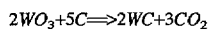

$$2WO_3 + 5C \Longrightarrow 2WC + 3CO_2$$

When the preform contains no free carbon, during burn-out or sintering, the following chemical reaction occurs:

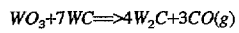

$$WO_3 + 7WC \Longrightarrow 4W_2C + 3CO(g)$$

as well as the less prominent reaction:

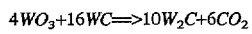

$$4WO_3 + 16WC \Longrightarrow 10W_2C + 6CO_2$$

Therefore, either with or without free carbon, oxidizing of the monotungsten carbide results in the formation and evolution of carbon monoxide and carbon dioxide gases, which lowers the tungsten-bound carbon in the sintered product. The oxidizing should be performed for a sufficient length of time to achieve an oxygen level in the preform which will result in a level of tungsten-bound carbon in the sintered product of at most 6.05 weight percent. Typically, the oxidizing is continued until the monotungsten carbide has a weight gain of at least about 0.25 weight percent, more preferably, at least about 0.3 weight percent, and, most preferably, at least about 0.4 weight percent. Mathematical equations may be determined by those skilled in the art which would roughly correlate the level of oxidation of the monotungsten carbide with the level of tungsten-bound carbon in the sintered product.

Alternative to using mathematical equations to estimate the level of additives or oxidizing needed to achieve certain levels of tungsten-bound carbon in the sintered product, the correlation between the additives or oxidizing may be determined empirically.

Although there may be other ways, five specific ways for adjusting the composition of the preform to achieve a desired resulting carbon level in the sintered product are described above. Combinations of the five approaches may also be used. One preferred combination of approaches is the addition of tungsten and tungsten trioxide when using pressureless sintering processes. In the case of injection molded objects containing 50 weight percent organic binder, an especially preferred method includes the addition of 2 weight percent tungsten trioxide and 9.57 weight percent elemental tungsten to a monotungsten carbide powder, the weight percents being based on the weight of the monotungsten carbide powder.

As mentioned, once a preform is formed having the desired composition, the preform is typically processed through a binder removal step. Binder removal usually entails heating the preform from ambient temperature to a temperature sufficient to pyrolyze the highest molecular weight component. If a polyolefin is used as part of the binder formulation, the temperature sufficient to pyrolyze the highest molecular weight component commonly occurs from 500° to about 600° C., An especially suitable temperature for the burn-out step is about 750° C. to about 900° C. which is the temperature at which the reduction of carbon by the oxide can take place and carbon monoxide and/or carbon dioxide may be evolved. Binder burn-out processes may be performed in vacuum or in any inert atmosphere. A reducing atmosphere, i.e., CO or $H_2$, can also be used, but the carbon-getters would have to be adjusted accordingly to yield the desired results. Alternatively or subsequent to binder burn-out, the preform may be debindered using chemical methods.

After debindering operations, the debindered preform may undergo pre-sintering, green machining, reisopressing, and the like. The preform is then sintered at elevated temperatures by pressure-assisted or pressureless techniques. Typical sintering temperatures for tungsten carbide are from about 1500° C. to about 1850° C., more typically, from about 1600° C. to about 1700° C. A temperature hold between 800° C. and 1200° C. is preferred either in the debindering step or in the sintering step to allow the release of carbon monoxide and/or carbon dioxide before it is trapped in the material by densification. The greatest benefit of the present invention is realized in pressureless sintering techniques, which are sintering techniques performed at or below atmospheric pressure. The sintering atmosphere may be, for example, nitrogen gas.

Depending on additives and the sintering temperatures employed, the sintering may be liquid-phase sintering or non-liquid-phase sintering. Liquid-phase sintering is sintering which occurs at a temperature at or above the liquidus temperature of the material being densified or any added materials, such as "sintering aids" (which are added to enhance sinterability). Non-liquid-phase sintering is sintering which occurs at a temperature below the liquidus temperature of all of the components of the material being densified. Usually, with tungsten carbide and pressureless sintering techniques, non-liquid phase sintering is employed.

Composition Embodiment

Yet another embodiment of the present invention is a tungsten carbide-containing material wherein the tungsten carbide has the general formula, $W_xC$, wherein x is greater than one and less than two and there is less than 0.20 weight percent cobalt, preferably less than about 0.15 weight percent cobalt, in the tungsten-carbide containing material. Preferably, x is from about 1.01 to about 1.13 and the tungsten carbide-containing material has less than about 0.15 weight percent cobalt, and, more preferably, the tungsten carbide-containing material has less than about 0.10 weight percent cobalt.

The tungsten carbide-containing material of the present invention contains monotungsten carbide, ditungsten carbide, and possibly some negligible amounts of elemental tungsten, tungsten trioxide, and free carbon. Preferably, the ditungsten carbide is present in an amount of at most about 20 weight percent based on the total weight of monotungsten carbide and ditungsten carbide.

The tungsten carbide-containing material has a density of at least about 97% theoretical, preferably, at least about 98% theoretical, and, more preferably, at least about 99% theoretical. Theoretical density of monotungsten carbide is 15.63 g/cm$^3$, and theoretical density of ditungsten carbide is 17.15 g/cm$^3$. The theoretical density of the tungsten carbide-containing material of the present invention will vary between 15.63 and 17.15 g/cm$^3$ when the body is formed of monotungsten carbide and ditungsten carbide, and the density will depend on the relative ratio of the two components. If the tungsten carbide-containing material contains other materials, such as solid solution carbides or grain growth inhibitors, the density may vary from this range.

The tungsten carbide-containing materials of the present invention typically have Vickers hardnesses of at least about 2400 kg/mm$^2$. Preferably, the material has a Vickers hardness of at least about 2500 kg/mm$^2$.

The tungsten carbide-containing material of the present invention typically has a porosity of less than about 2.0%, as measured by image analysis.

By way of illustration, densified tungsten carbide bodies are especially useful in high wear applications such as nozzles, particularly waterjet cutting nozzles and spray dry nozzles. The bodies are also suitable for use as drills, pump seals, cutting tools, and other wear applications.

Accordingly, the material of the present invention is a sintered tungsten carbide-containing material which is hard, has high density, and may be made by simple and less-hazardous methods than earlier methods. The present invention also provides a method which is simple and capable of forming sintered tungsten carbide-containing parts with complex shapes or small openings.

The following examples are illustrative only and should not be construed as limiting the invention which is properly delineated in the appended claims.

EXAMPLES

Examples 1–16

In examples 1–4 and 9–12, 15 g (GE U10-4795) tungsten powder, available from the General Electric Company, was mixed with 485 g "SYL-CARB" SC104 WC powder, available from Osram/Sylvania, resulting in a 3 weight percent addition of tungsten powder to WC powder. In examples 5–8 and 13–16, 30 g (GE U10-4795) tungsten powder was mixed with 485 g "SYL-CARB" SC104 WC powder resulting in a 6 weight percent addition of tungsten powder to WC powder.

The mixtures were each individually loaded into a 1.4 liter stainless steel tank lined with polyethylene. In each example, the tank contained 6.3 kg 3-mm WC/Co milling media, a polyethylene coated impeller, and 400 ml heptane. A nitrogen atmosphere was maintained in the tank. The impeller was turned at 100 rpm until all of the powder appeared to be wetted, forming a slurry. Attrition of the slurry was then conducted at an impeller speed of 275 rpm. Periodically, heptane was added to the tank to maintain a sufficient amount of heptane for mixing. Examples 1–8 were attrited for 3 hours, and examples 9–16 were attrited for 6 hours.

One hour before the end of the attrition cycle of each example 1–16, 10 grams of paraffin wax were added to each of the slurries. At the ends of the attrition cycles, the slurries were each poured through a coarse screen to remove the milling media and transferred to a round bottom flask. The heptane was removed from the slurries by rotary evaporation at 70° C., forming dry powder. The dried powder samples were then screened through a 45-mesh sieve. Approximately 20 grams of each of the powder samples were poured into a ¾" steel die and pressed at 2000 psi to form a compact. The compacts were then isostatically pressed at 30,000 psi.

In Examples 2, 4, 6, 8, 10, 12, 14, and 16, the wax was burned out in vacuum of 0.1 torr at 450° C. to debinder the compacts. In Examples 1, 3, 5, 7, 9, 11, 13, and 15, the wax was burned out in a nitrogen atmosphere at 450° C.

The debindered compacts were then sintered for one hour at 1650° C. in nitrogen at atmospheric pressure in one of two furnaces with a ramp rate of 10 c/minute. Compacts in Examples 1, 2, 5, 6, 9, 10, 13, and 14 were sintered in a 2 ft$^3$ furnace. Compacts in Examples 3, 4, 7, 8, 11, 12, 15, and 16 were sintered in an ASTRO furnace having a 6"×3" hot zone. The compacts in Examples 3, 7, 11, and 15 were placed in a box furnace containing an Inconel retort after debindering but before sintering.

Densities of the sintered compacts were determined by immersion, carbon contents of the sintered compacts were determined 0by combustion, and hardnesses of the sintered compacts were determined on a polished sample of the compact using a Vicker's diamond under a 1000 gram load. The properties of the sintered compacts are provided in Table 1. Examples 1 and 9 are comparative examples, as the carbon levels in the sintered compacts were greater than 6.05 weight percent. The compacts in examples 1 and 9 had lower densities and hardnesses than sintered compacts processed under the same conditions but having lower carbon levels.

TABLE 2

| Example # | Density (g/cc) | Carbon (wt %) | Hardness (kg/mm$^2$) |
|---|---|---|---|
| 1 | 14.88 | 6.07 | 2259 |
| 2 | 15.06 | 5.95 | 2426 |
| 3 | 15.21 | 5.93 | 2458 |
| 4 | 15.17 | 5.94 | 2413 |
| 5 | 15.34 | 5.89 | 2452 |
| 6 | 15.43 | 5.82 | 2580 |
| 7 | 15.56 | 5.75 | 2569 |

TABLE 2-continued

| Example # | Density (g/cc) | Carbon (wt %) | Hardness (kg/mm$^2$) |
|---|---|---|---|
| 8 | 15.54 | 5.78 | 2563 |
| 9 | 15.14 | 6.10 | 2396 |
| 10 | 15.40 | 5.94 | 2606 |
| 11 | 15.47 | 5.96 | 2569 |
| 12 | 15.44 | 5.95 | 2526 |
| 13 | 15.33 | 5.97 | 2527 |
| 14 | 15.49 | 5.81 | 2622 |
| 15 | 15.58 | 5.77 | 2593 |
| 16 | 15.58 | 5.76 | 2528 |

Examples 17–22

In Examples 17 and 18, 495 g tungsten carbide WCO$_2$N, available from Tokyo Tungsten, was attrited with 5 g WO$_3$ (resulting in 1 weight percent WO$_3$) in heptane to form a slurry. In Examples 19–22, 465 g tungsten carbide WCO$_2$N was attrited with 4.7 g WO$_3$ and 30 grams tungsten powder (resulting in 1 weight percent WO$_3$ and 6 weight percent tungsten powder) in heptane to form a slurry. WC/Co milling media was used for the attrition cycle. After 5 hours of attrition, 7.5 g paraffin wax was added to each of the slurries. The slurries were attrited one more hour after the paraffin wax addition before the attrition was stopped. Low levels of cobalt were added to the powder mixture during attrition due to the use of the WC/Co milling media. The level of cobalt added to the powder mixtures is provided in Table 2. The slurries were formed into compacts which were pressed at 2000 psi, isopressed at 30,000 psi, then heat treated for debindering in a box furnace. Examples 17, 19, and 20 were debindered at 450° C., and Examples 18, 21, and 22 were debindered at 850° C. The debindered compacts were then sintered at 1650° C. (Examples 17, 18, 19, and 21) or at 1750° C. (Examples 20 and 22) using a 10° C./minute ramp rate. All of the Examples 17–22 densified and exhibited high hardnesses. Properties of the densified compacts are provided in Table 2.

TABLE 2

| Example # | Cobalt (wt %) | Density (g/cc) | Carbon (wt %) | Hardness (kg/mm$^2$) |
|---|---|---|---|---|
| 17 | 0.11 | 15.3 | 6.05 | 2629 |
| 18 | 0.11 | 15.3 | 5.99 | 2682 |
| 19 | 0.14 | 15.51 | 5.73 | — |
| 20 | 0.14 | 15.58 | 5.69 | — |
| 21 | 0.14 | 15.53 | 5.68 | 2659 |
| 22 | 0.14 | 15.6 | 5.62 | 2666 |

Examples 23

459.8 g WCO$_2$N tungsten carbide powder from Tokyo Tungsten, 104 g WO$_3$ powder from Osram/Sylvania, 49.76 g tungsten powder from the General Electric Company, and 400 ml heptane were milled together in a 1400 cc attritor tank containing 6960 g WC/6%Co milling media to create a slurry. After milling for 5 hours at 330 rpm, 1.04 g paraffin wax and 40 additional ml of heptane were added to the slurry. Milling was continued for one more hour. The milling media was removed from the slurry, and, thereafter, the heptane was removed from the slurry to form a dried powder using a rotary evaporator. The dried powder had a measured cobalt content of 0.11 weight percent. The dried powder was then mixed with 25.97 g binder and dispersant at 130° C. and 60 rpm with a Haake Rheocord System 40 torque rheometer, available from Haake, Inc., Saddlebrook, N.J., for 15 minutes after a steady state torque was reached, which took about 30 minutes of mixing. Three-inch long greenware tubes having a 0.3725" diameter and a 0.045" through-hole were injection molded from the mixture at 117° C., injected at a rate of 60 cm$^3$/sec and held at a barrel pressure of 2470 psi until cooled. The molded parts were debindered by heating for 92 hours stepwise to 850° C. The debindered greenware tubes were sintered in a graphite resistance heated furnace at 1700° C. for 1 hour. The tubes, even after sintering, still had the through-holes. The sintered tubes had an average density of 15.4 g/cm$^3$, a Vickers hardness of 2700 kg/mm$^2$, and a carbon content of 5.83 weight percent.

Example 24

5 kg SCO4 tungsten carbide powder, available from Osram/Sylvania, was attrited at 275 rpm in a 1-S attritor using 50 kg of WC/6%Co milling media and 3500 ml of heptane for 8 hours. 10 g paraffin wax was added to the milled powder at the end of the attrition time. The heptane was removed from the milled powder using a rotary evaporator. A short right greenware cylinder, 19 mm in diameter by about 11 mm long, was uniaxially pressed at 5000 psi, then bagged, and isostatically pressed at 45,000 psi. The greenware cylinder was dewaxed by heating to 450° C. in nitrogen. Immediately after the dewax cycle, the greenware cylinder was weighed and left in ambient conditions (about 25° C.) to allow for oxidation of the cylinder. After 100,000 minutes, the greenware cylinder had increased its weight by 0.6%. The greenware cylinder was heated at 10° C./minute in nitrogen to a sintering temperature of 1700° C. and held at this temperature for 1 hour. The sintered cylinder had a density of 15.65 g/cm$^3$, a Vickers hardness of 2562 kg/mm$^2$, and a carbon content of 5.80 weight percent.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced otherwise than as specifically described.

What is claimed is:

1. A tungsten carbide-containing material, comprising tungsten carbide having the general formula, W$_x$C, wherein x is greater than one and less than two, the tungsten carbide-containing material having an amount less than 0.20 weight percent of cobalt present and having a density of at least about 97% of its theoretical density and a Vickers hardness of at least about 2400 kg/mm$^2$.

2. The tungsten carbide-containing material of claim 1, wherein cobalt is present in an amount less than about 0.15 weight percent.

3. The tungsten carbide-containing material of claim 1, wherein x is from about 1.01 to about 1.13.

4. The tungsten carbide-containing material of claim 1, wherein the material has an amount less than about 0.10 weight percent of cobalt present.

5. The tungsten carbide-containing material of claim 1, wherein the material has a density of at least about 98% of its theoretical density.

6. The tungsten carbide-containing material of claim 1, wherein the material has a Vickers hardness of at least about 2500 kg/mm$^2$.

7. A tungsten carbide-containing material, comprising tungsten carbide having the general formula, W$_x$C, wherein x is from about 1.01 to about 1.13, the tungsten carbide-containing material having an amount less than about 0.15 weight percent of cobalt present and having a density of at least about 98% of its theoretical density and a Vickers hardness of at least about 2500 kg/mm$^2$.

* * * * *